United States Patent
Clayton, Jr. et al.

(10) Patent No.: US 6,247,357 B1
(45) Date of Patent: *Jun. 19, 2001

(54) DYNAMOMETER FOR SIMULATING THE INERTIAL AND ROAD LOAD FORCES ENCOUNTERED BY MOTOR VEHICLES AND METHOD

(75) Inventors: William Clayton, Jr., San Marino; Dmitry Shchedrin, Arcadia, both of CA (US)

(73) Assignee: Clayton Industries, El Monte, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/424,259

(22) PCT Filed: Aug. 29, 1994

(86) PCT No.: PCT/US94/09568

§ 371 Date: Jul. 10, 1995

§ 102(e) Date: Jul. 10, 1995

(87) PCT Pub. No.: WO95/06866

PCT Pub. Date: Mar. 9, 1995

Related U.S. Application Data

(63) Continuation-in-part of application No. 08/114,220, filed on Aug. 30, 1993, now Pat. No. 5,445,013.

(51) Int. Cl.$^7$ ................................................. G01M 15/00
(52) U.S. Cl. .......................................... 73/117; 73/862.08
(58) Field of Search ............................. 73/112, 116, 117, 73/117.3, 123, 125, 862, 862.041, 862.08, 862.381

(56) References Cited

U.S. PATENT DOCUMENTS

| | | |
|---|---|---|
| 2,585,475 | 2/1952 | Lee et al. . |
| 3,518,466 | 6/1970 | Bunner . |
| 3,838,323 | 9/1974 | Anderson . |
| 3,863,083 | 1/1975 | Jaeschke . |
| 4,077,255 * | 3/1978 | Murakami ............................. 73/117 |
| 4,798,378 | 1/1989 | Jones . |
| 4,853,574 | 8/1989 | Estaque . |
| 4,982,127 | 1/1991 | Marandet . |
| 5,086,647 | 2/1992 | Kamata et al. . |
| 5,101,660 * | 4/1992 | La Belle ............................. 73/117 |
| 5,154,076 * | 10/1992 | Wilson et al. ........................ 73/117 |
| 5,385,042 * | 1/1995 | La Belle ............................. 73/117 |
| 5,445,013 * | 8/1995 | Clayton, Jr. et al. .................. 73/117 |
| 5,450,748 * | 9/1995 | Evans et al. ......................... 73/117 |
| 5,452,605 * | 9/1995 | Wilson et al. ........................ 73/117 |

* cited by examiner

*Primary Examiner*—Eric S. McCall
(74) *Attorney, Agent, or Firm*—Harold L. Jackson

(57) ABSTRACT

A chassis dynamometer includes a frame, a roll set for engaging the wheels of a motor vehicle and an eddy current brake/inertia simulating unit with a ferrous metal rotor wheel rotatably mounted on the frame and a plurality of stationary field coils. The rotor wheel is in the form of an open ended drum and has a rotational mass which is equal to the trim inertia of the dynamometer, i.e., the base or minimum inertia that the dynamometer is designed to simulate less the roll set inertia. The rotor wheel inertia is preferably within the range of a 70 to 90% of the base or minimum inertia of the dynamometer. A force transducer and a speed encoder provided a measure of the force applied to the roll by the wheel and the speed of the roll, respectively. A controller, in response to the roll speed and force applied to the roll controls the current to the field coils in accordance with a selected simulated inertia and road load for the vehicle.

18 Claims, 4 Drawing Sheets

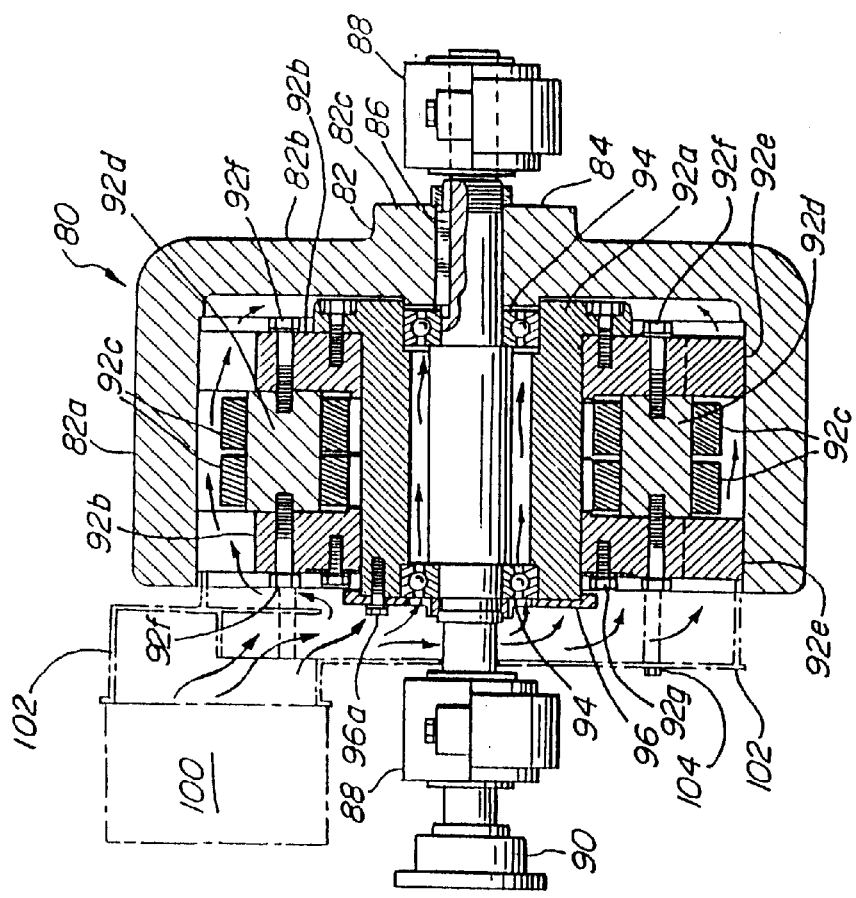
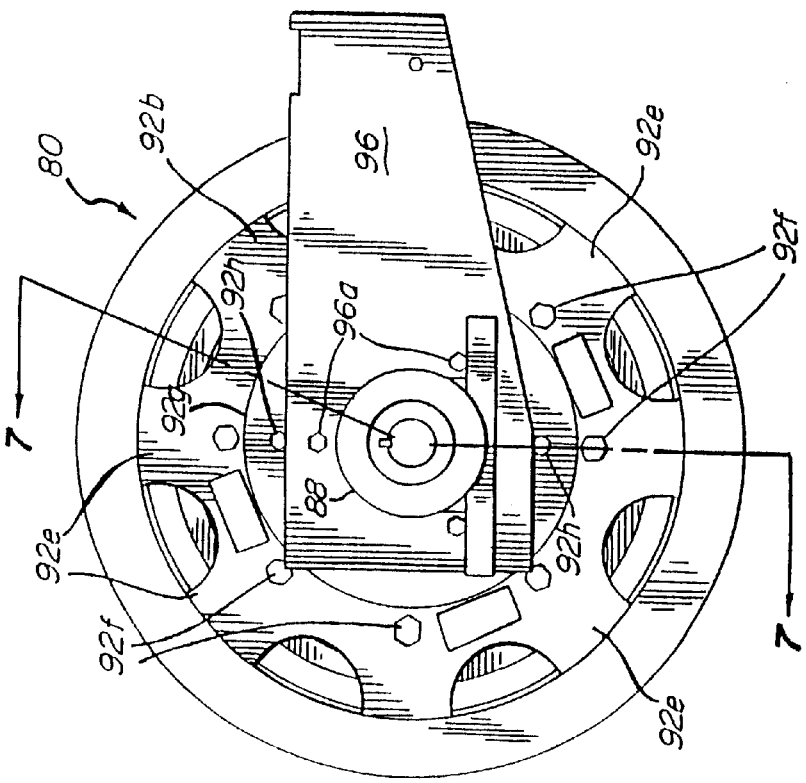

DYNAMOMETER FOR SIMULATING THE INERTIAL AND ROAD LOAD FORCES ENCOUNTERED BY MOTOR VEHICLES AND METHOD

TECHNICAL FIELD

This invention relates to chassis dynamometers for simulating the inertia and road load forces encountered by motor vehicles under anticipated driving conditions and more particularly to such dynamometers which employ an eddy current brake as the power absorbing unit. The application is a continuation-in-part of U.S. application Ser. No. 08/114,220 filed Aug. 30, 1993, now U.S. Pat. No. 5,445,013 for Dynamometer for Simulating the Inertial and Road Load Forces Encounterd by Motor Vehicles and Method.

BACKGROUND ART

Test apparatus in the form of dynamometers is widely used for testing motor vehicles in place. Since the test vehicles are not moving over a road bed, the dynamometer must simulate certain forces normally associated with actual vehicle operation. These parameters include forces associated with inertia (related to the mass or weight of the vehicle) and road load forces (related to the velocity of the vehicle). The vehicle engine (or its braking system) must overcome inertial forces in order to accelerate or decelerate the vehicle. In addition, the engine must overcome breakaway frictional and rolling frictional forces (i.e., road/tire friction) as well as windage forces (i.e., drag forces caused by air passing over the vehicle). These latter forces are commonly referred to as road load (RL) forces and may be represented by the formula:

$$RL = A + BV + CV^2 + DW$$

where A represents the vehicle constant load coefficient (e.g., effects of breakaway force), and, B and C represents the vehicle load coefficient dependent on velocity and velocity squared (e.g., windage), and D represents the grade coefficient (e.g., slope of the grade). It should be noted that a load coefficient based on velocity cubed may be added if desired). V represents the vehicle velocity and W represents the vehicle weight.

The purpose of the dynamometer is to impose those forces on the vehicle which the vehicle would incur during actual operation on a road. Such dynamometers include a roll (or a pair of rolls) for engaging the driven wheel (e.g., motorcycle) or wheels (e.g., automobile) of the vehicle being tested. It should be noted that where 4 or 6 wheel drive vehicles are to be tested the dynamometers will include 2 or 3 pair of rolls. The roll or rolls are supported by a shaft journaled in bearings mounted on a frame.

Typically a power absorbing and supplying unit such as an electric motor or a power absorber per se such as an eddy current brake, friction brake or hydrokinetic brake carried by the frame, is coupled to the roll for absorbing power from the roll. The roll in turn applies a retarding force to the surface of the vehicle wheel (e.g., tire) to simulate the road load and inertial forces. Inertial forces can be simulated by an electric motor during acceleration as well as deceleration but can only be simulated by a power absorber/brake during acceleration only because such braking units only absorb and do not supply power. Generally (and often when electric motors are used) a large part of the inertial forces are simulated by selectively coupling the roll to one or more mechanical flywheels. The combined inertia of the flywheels, the roll and other rotating components exert a force on the vehicle wheels proportional to the acceleration (or deceleration) of the vehicle wheels. Thus, the engine is required to expend as much power in accelerating the roll as it does in overcoming the vehicle inertia during actual road acceleration. Road load and inertial forces which must be simulated by the dynamometer may be calculated from the formula:

$$F = A + BV + CV^2 + DW + I\frac{dv}{dt}$$

wherein I represents the simulated inertia, dv/dt the derivative of velocity with respect to time (or the acceleration of the vehicle).

While electric motors (power supplying and absorbing units) increase the versatility of a dynamometer they also significantly increase the cost. For that reason, dynamometers equipped with power absorbers which provide braking only are in considerable demand for mass vehicle emission testing stations, mandated by the U.S. Environmental Protection Agency ("EPA"), as well as for facilities which must provide the necessary repairs so that rejected vehicles can pass a renewed emissions test. Both friction brake and eddy current brake dynamometers are typically less expensive to manufacture than dynamometers equipped with electric motors or hydrokinetic absorbers. However, friction brakes are subject to wear and thus require considerable maintenance. Eddy current brake dynamometers do not suffer the wear problems associated with friction brake machines and are particularly cost effective for EPA testing and repair applications.

Dynamometers utilizing an eddy current brake (or other power absorbing units) are designed with a base or minimum inertia i.e., the smallest vehicle inertia which can be simulated and a maximum inertia, i.e., the largest inertia which can be simulated. The minimum dynamometer inertia is made up of the inertia of the roll or roll set, the inertia of the rotating component of the absorber and a trim inertia. The term roll or roll set inertia, as used herein, shall mean the rotational inertia of the roll or roll set which engage the vehicle wheel(s) plus the inertia of minor inertia contributing auxiliary components such as the shaft(s), couplings and gears or belts, where used, which are permanently connected to the roll. The inertia of such auxiliary components is less than that of the roll or roll set.

The trim inertia in a typical dynamometer is that inertia required to bring the total inertia of the parts of the dynamometer permanently connected to the rolls up to the designed minimum inertia. The trim inertia in a dynamometer utilizing an eddy current brake (or other power absorbing unit) is typically made up of a fixed flywheel, i.e., a mechanical flywheel permanently connected to the roll. As an example, an eddy current brake dynamometer designed to test motor vehicles weighing 2000 pounds or more would include a roll set inertia of say 300 pounds, a braking unit inertia (i.e., the rotor inertia) of say 200 pounds and a fixed flywheel inertia of 1500 pounds. Additional flywheels, clutched to the roll shaft, generally make up the difference between the dynamometer's minimum inertia (e.g., 2000 pounds) and its maximum inertia (e.g., 5000 to 6000 pounds). It should be noted that the braking unit per se may be used to simulate the difference between the base and maximum inertia during acceleration only as pointed out above.

Eddy current brakes comprise a rotating wheel made of a suitable electrically and magnetically conducting material with sufficient strength to withstand the centrifugal and other forces encountered. Stationary field coils are positioned adjacent the rotor for generating an exciting magnetic field which in turn induces eddy currents in the rotating rotor. Eddy currents generate the secondary high density magnetic field in a gap between rotor and coils which causes the absorber to apply a braking torque to the roll and to the vehicle tire in contact with the roll. The amount of braking torque is determined by the density of the magnetic field which is controlled by the current supplied to the field coils.

Typical eddy current brakes are designed to minimize the rotor mass so that energy is not wasted in accelerating or decelerating extra mass.

We have discovered, contrary to the prevailing view, that there are advantages to increasing the rotor mass of an eddy current brake so that the rotor makes-up the dynamometer's trim inertia. The resulting eddy current brake/trim inertia simulating unit provides several important advantages. First, the combined unit eliminates the need for a separate trim inertia flywheel (and bearings) with its attendant extra costs (i.e., about 5% of the cost of dynamometer capable of simulating inertias of 2000 to 5500 pounds). Second, and much more obscure, the large rotor mass accommodates higher power absorptions because of the much larger heat sink and the attendant increased area for heat dissipation. Third, the large rotor mass surprisingly requires lower magnetic field strength and lower power consumption and much lower magnetic saturation of the rotor iron as compared with a conventional eddy current brake having a comparable short term braking capacity. The net result is the elimination of an expensive trim flywheel and higher power/torque absorption levels.

SUMMARY OF THE INVENTION

A chassis dynamometer having a base and maximum inertia for simulating the inertial and road load forces of motor vehicle includes a frame, at least one roll (preferably at least two rolls, comprising a roll set) for engaging the driven wheel(s) of the vehicle and a combined power absorbing and inertia simulating unit with an electrically conducting (preferably made of low carbon steel) rotor wheel or wheels rotatably mounted on the frame for rotation with the roll. The power absorbing/inertia simulating unit includes a stator having at least one and preferably a plurality of stationary field coils positioned adjacent the rotor wheel for inducing eddy currents in the rotor wheel to apply a braking force to the wheel. The rotor has a rotational mass within the range of 50 to 90% and preferably 80 to 90% of the base inertia of the dynamometer and preferably has a rotational mass equal to the trim inertia of the dynamometer.

A force transducer is coupled between the frame and the stator for providing a measure of force applied to the roll by the power absorbing unit minus the force attributable to the dynamometer parasitic losses. A speed encoder provides a measure of the roll speed and a controller responsive to the roll speed and the force applied to the roll, supplies current to the field coil in accordance with a selected simulated inertia and road load force for the vehicle.

The features of the present invention can best be understood by reference to the following description taken in conjunction with the accompanying drawings wherein like reference numerals indicate like components.

BRIEF DESCRIPTION OF THE DRAWINGS

FIG. 6 is an end view of an eddy current brake/trim inertia unit in accordance with this invention; and FIG. 7 is a cross-sectional view taken along lines 7—7 of FIG. 6.

DESCRIPTION OF THE PREFERRED EMBODIMENT

Figure 1:
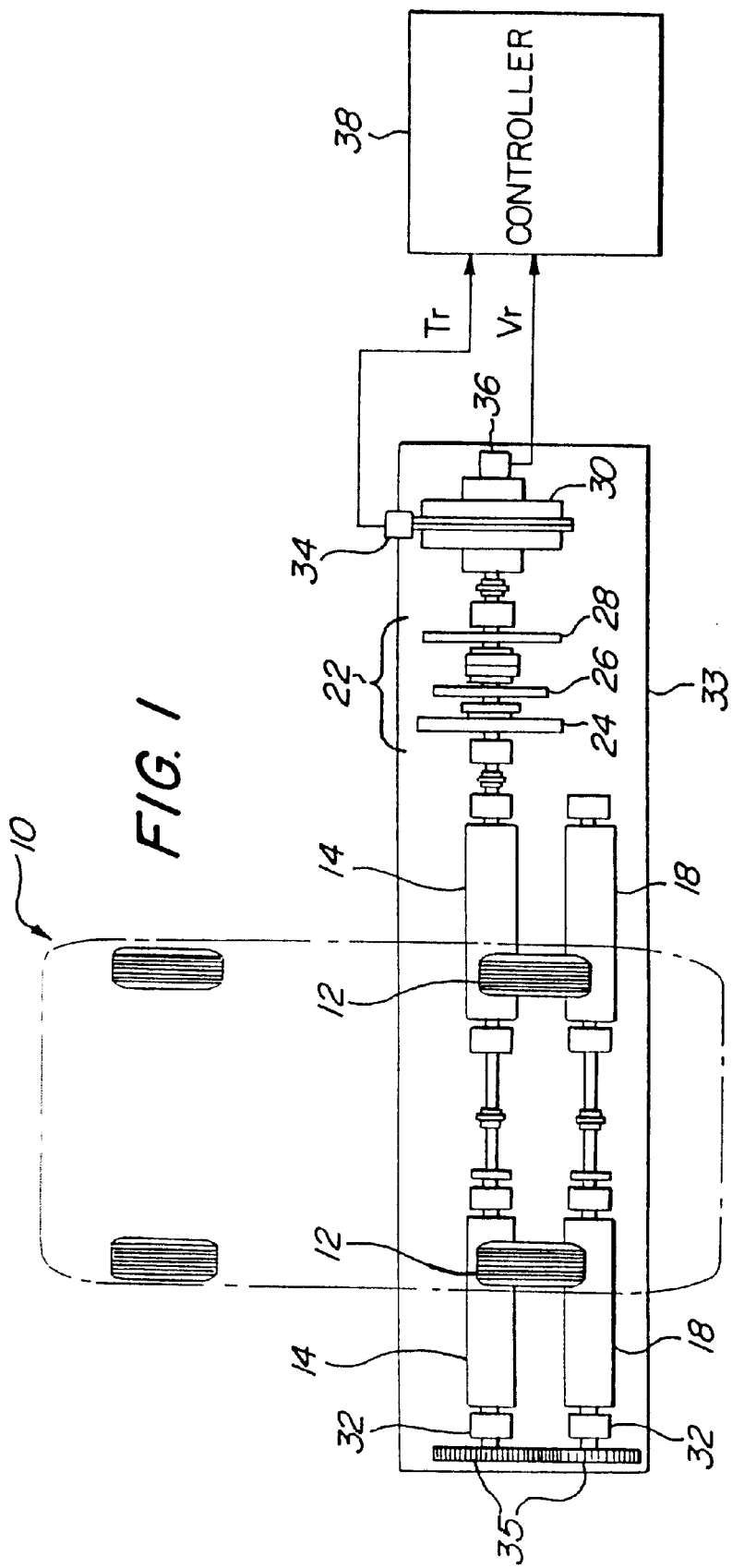
FIG. 1 is a block diagram of a dynamometer apparatus in accordance with the present invention.

Referring now to the drawings and more particularly to FIG. 1, there is illustrated a dynamometer in accordance with the present invention for simulating the inertia and road load forces of a vehicle 10 have rear wheels 12. A pair of rolls 14 mounted on a shaft 16 and a pair of rolls 18 mounted on a shaft are illustrated as engaging the rear (driven) wheels of vehicle 10. A flywheel assembly 22 consisting of three flywheels 24, 26 and 28 and an eddy current brake/inertia simulating unit 30 are also coupled to the shaft 16. The flywheels 24, 26 and 28 are individually clutched to the shaft while the rotor wheel of the unit 30 is keyed to the shaft as will be explained. Bearings 32 rotatably support the shafts 16 and 20 on a frame 33. The shafts 16 and 20 may be coupled through suitable gears 35 or belts to rotate in unison.

A conventional load cell 34 is mounted between the stationary part of the brake/inertia unit 30 for providing a signal representative of the force applied to the vehicle wheels 12 minus the force attributable to the dynamometer parasitic losses. A conventional speed encoder 36 supplies a signal representative of speed of the rolls 14. The force and speed signals are supplied to a power controller 38 which supplies current to the field coils (to be described) of the brake/inertia unit to cause that unit to apply a braking force (or torque) to the shaft 16, the rolls 14 and the wheels 12 (after compensating for parasitic losses) in accordance with a selected vehicle inertia and road load for the vehicle 10 in a well known manner. See, for example, U.S. Pat. No. 5,101,660.

Figure 2:
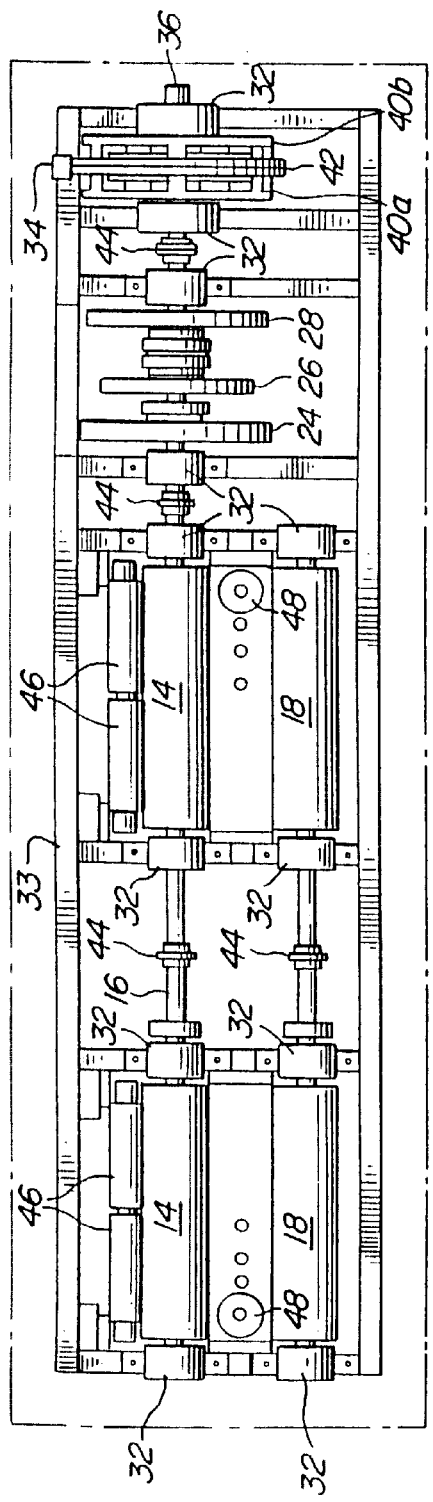
FIG. 2 is a plan view of the dynamometer of FIG. 1 without the controller.
Figure 3:
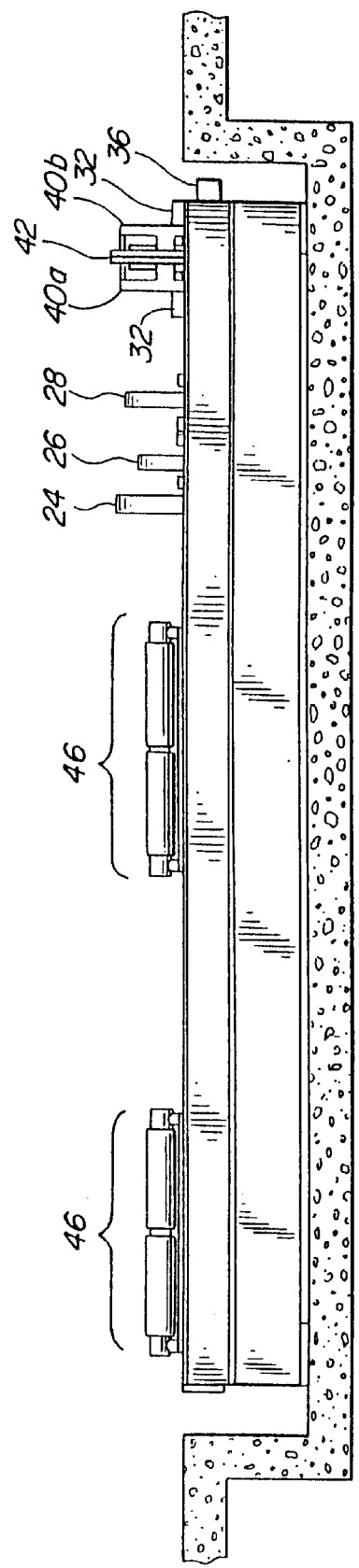
FIG. 3 is an elevational view of the apparatus of FIG. 2 illustrating the apparatus installed in a typical open pit.

Referring now to FIGS. 2 and 3, flywheels 24, 26 and 28 are individually and selectively clutched to the shaft 16 via clutches 27. The clutches may be controlled, for example, by a central computer (not shown). The rotor 40 of the brake/inertia unit 30 comprises two separate wheels 40a and 40b permanently keyed to the shaft 16 and separated by a stationary field coil arrangement or stator 42 connected to the frame 33 in conjunction with the load cell 34 which measures the applied force between the stator and frame. The speed encoder 36 is mounted directly to the shaft 16 in a well known manner. Couplings 44 are arranged as shown for coupling sections of the shafts 16 (and 20) together.

Forward and side vehicle restraints 46 and 48, respectively, which may be selectively raised and lowered, restrain the vehicle from leaving the roll set during operation of the dynamometer.

Figure 5:
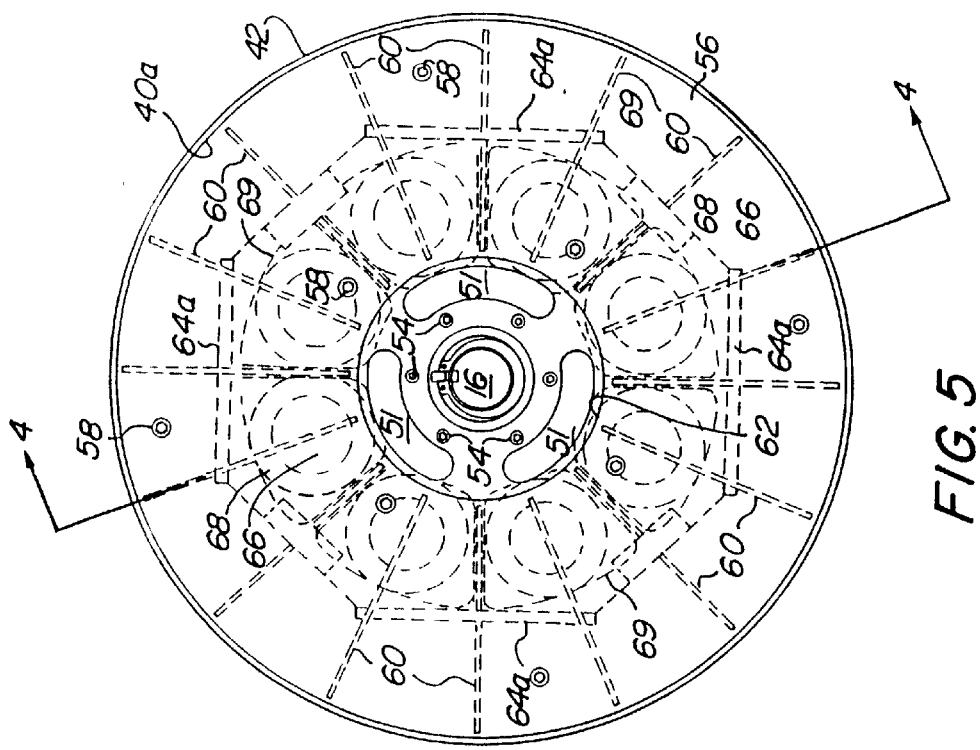
FIG. 5 is a side elevational view of the eddy current brake/trim inertia unit.
Figure 4:
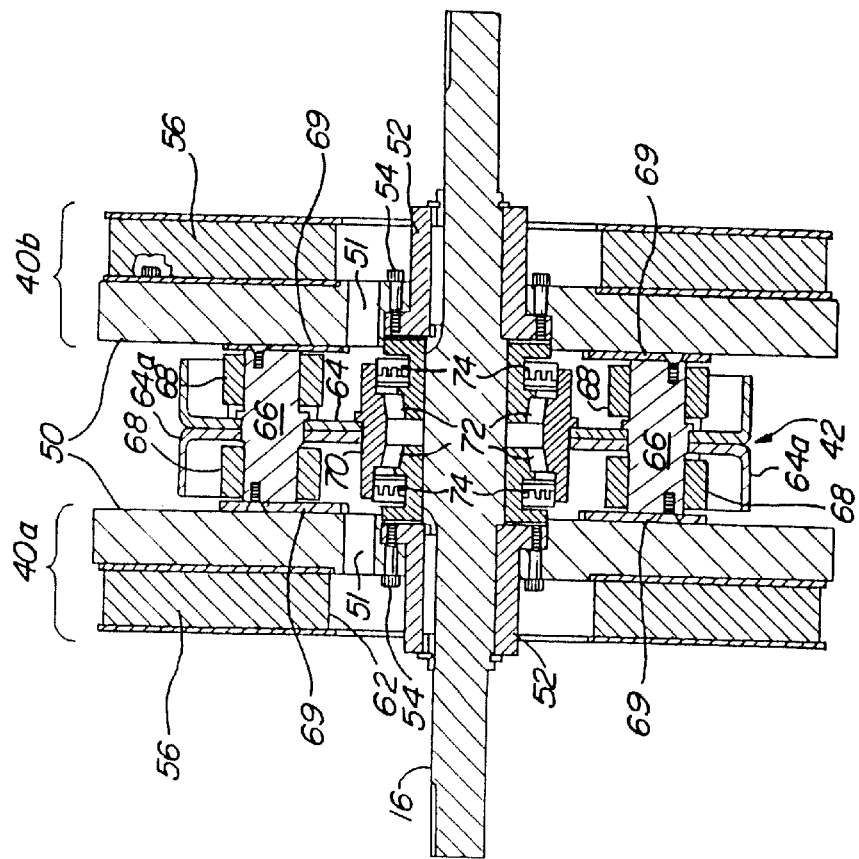
FIG. 4 is a cross-sectional view of the eddy current brake/trim inertia unit incorporated into the apparatus of FIG. 2 taken along lines 4—4 of FIG. 5.

Referring now to FIGS. 4 and 5 each of the rotor wheels 40a and 40b comprise a wheel section 50 secured to a hub 52 via bolts 54 and a fan section 56 bolted to the wheel section by bolts 58. The hubs 52 are keyed to the shaft 16 as illustrated.

The wheel sections 50 include openings 51 adjacent the hubs 52 to allow air (for cooling) to freely circulate through the interior of the rotor and stator. The fan sections 56 are provided with radially extending vanes 60 (FIG. 5) which terminate at their inner ends in circular openings 62.

The stator 42 comprises a pair of metal plates 64 (welded together) which carry eight axially extending cylindrical cores 35 66, sixteen stator coils 68 wound on the cores, sixteen pole pieces 69 and a hub 70. The hub 70 is rotatably mounted on the shaft 16 via roller thrust bearings 72. Labyrinth lubrication seals 74 extend between the hub 70 and the shaft 16. The cores 66 are symmetrically arranged around the rotor axis x—x as shown.

Each of the stator plates 64 include radially extending tabs 64a which are bent at right angles to the plane of the central portion of the plates 64 (and to the rotor wheels) as illustrated to provide increased stiffness for the stator. The torque transducer or load cell 34 is connected between the stator 42 and the frame 33. The load cell may be connected between one of the tabs 64a and the frame to prevent the stator from rotating with the shaft and to provide the force signal discussed earlier.

The field coils 68 are energized with d.c. current in a conventional manner, adjacent coils and pole pieces producing a magnetic circuit, forcing eddy currents to be developed in the rotor wheel.

The maximum inertia of a dynamometer is the largest vehicle inertia which can be simulated by the dynamometer, e.g., the largest inertia which the dynamometer is designed to simulate. The minimum or base inertia is the smallest vehicle inertia which can be simulated by the dynamometer, e.g., the smallest inertia which the dynamometer is designed to simulate. The trim inertia of the dynamometer of this invention, which does not use a fixed trim flywheel in the conventional sense, is equal to the difference between the minimum inertia and the roll inertia e.g., the inertia of the roll or roll set and the auxiliary rotating components of the dynamometer (such as the shaft couplings, gears of belts) which are permanently coupled to the roll. The roll inertia does not include the inertia of the rotating component (e.g., rotor) of the power absorbing/inertia simulating unit.

The rotational inertia of the eddy current rotor preferably is within 50% to 90% of the base or minimum inertia of the dynamometer and most preferably between 70% to 90% or even 80% to 90% of the base inertia. The rotational inertia of the rotor is also preferably at least 20% of the designed maximum inertia to be simulated by the dynamometer. It should be noted that the inertia attributable to the absorber or braking rotor element in a conventional dynamometer is subsumed in the inertia of the rotor in he present invention. Therefore, the brake rotor wheels per se make up the trim inertia.

A dynamometer designed to provide a base inertia of 2000 pounds and a maximum inertia of 5500 pounds with a roll set inertia of 300 pounds will require a trim inertia for the rotor wheels 40a and 40b (and shaft) of 1700 pounds. Rotor wheel sections (50) manufactured of low carbon steel and having a diameter of 22.375 inches, a thickness of 1.826 inches and a weight of 162 KGF will provide such a trim inertia. In this example the eddy current brake rotor 40 provides 85% of the base inertia and about 31% of the maximum inertia. In the embodiment shown the flywheels 24, 26 and 28, having inertias of 2000 pounds, 500 pounds and 1000 pounds, respectively, make up the difference between the base and maximum inertia. Thus the mechanical inertia can be adjusted in 500 pound increments between the base and maximum inertia.

The length and diameter of the stator cores 66 are 4.888 and 2.283 inches, respectively and the field coils comprise 256 number of turns of 14 gage copper wire. The absorber power of the brake/inertia unit 30 has been measured at 45 KW with a continuous torque rating of 221 N-M at 1943 RPM.

Where the dynamometer is to be used in repair shops, e.g., to correct emissions problems, there may be no need for the mechanical flywheel assembly 22 since the eddy current brake/inertia unit 30 is capable of simulating the vehicle inertia during acceleration. Emissions during deceleration, i.e., acceleration pedal not depressed, are relatively insignificant to the emissions produced during acceleration.

Referring now to FIGS. 6 and 7 an alternative brake/inertia unit 80 for use in the dynamometer of FIGS. 1–3 (in place of the unit 30) comprises a rotor wheel 82 in the form of a cup or drum open at one end with an axially extending hollow cylindrical braking section 82a keyed to and supported on a shaft 84 via a radially extending web section 82d, hub section 82c and key 86. The shaft is supported on frame 33 via conventional bearing blocks 88. A coupling 90 may be used to couple the brake/inertia unit 80 to the shaft 16 which rotates with the rolls 14. The web section 82b may be provided with openings to allow air to circulate through the interior of the rotor and stator assembly to be described.

A stator assembly 92 comprises an axially extending hollow cylindrical hub section 92a, rotatably mounted on the shaft 84 via bearing 94, a pair of radially extending end sections 92b, forming the magnetic poles for the stator and field coils 92c wound on magnetic cores 92d located between the pole sections 92b. A restraining arm 96 is bolted to the hub section 92a via bolts 96a and arranged to be connected to the stationary frame 33 via the load cell 34. The two end sections 92b form individual pairs of opposed pole pieces or faces 92e positioned symmetrically around the circumference of the hub 92a. The pole pieces have curved end surfaces matching the curvature of the inner surface of the hollow cylindrical braking section 82a of the rotor. The stator cores 92d are secured to the stator end pieces 92b via bolts 92f. An annular plate 92g is recessed in he outer side of the end section 92b and secured thereto via bolts 92b a shown. A blower 100 and shroud 102 shown in phantom lines are mounted on the stator via bolts 104.

In operation the rotor wheel 82 rotates with the rolls 14 driven by the vehicle under test. The stator 92 remains stationary as a result of the connection between the restraining arm 96 and frame 13.

The current supplied to the field coils 92c, via power controller 38, generates a magnetic field between opposing pole faces 92e and within the braking section 82a of the rotor thereby forcing eddy currents to be developed in the rotor wheel which interact with the magnetic field to provide the braking action in a well known manner.

The braking/inertia unit 80 requires less mass for the rotor as compared with the radial disc rotor arrangement on the unit 30 to provide the same inertia and is considerably less expensive to manufacture. The rotational inertia of the rotor 82 is equal to the trim inertia of the dynamometer and preferably within 50% to 90% of the base or minimum inertia of the dynamometer and most preferably between 70% to 90% or even 80% to 90% of the base inertia. Again, like the rotor 40 of the brake/inertia unit 30, the rotor 82 preferably has a rotational inertia of at least 20% of the designed maximum inertia to be simulated by the dynamometer. The rotor wheel 50 is preferably made of low carbon steel with an outer diameter of about 21 inches, an inner diameter at the braking section 82a of about 17 inches and a weight of about 170 KG. This configuration is capable of providing 85% of a 2,000 pound base inertia of a dynamometer equipped with clutchable flywheels capable of providing a maximum inertia of 5000 pounds.

There has been described a novel eddy current brake dynamometer which (a) eliminates the need for a separate trim inertia flywheel and its attendant expense, (b) saves space and (c) accommodates higher power absorptions. The dynamometer has been found to be particularly useful in applications such as mass vehicle emission testing where the duty cycle (operating time/idle time)is relatively low e.g., 40% to 60%. Various modifications of the apparatus will occur to persons skilled in the art. For example, the brake/inertia unit may include a single rotor wheel. The stator need not be rotatably mounted on the shaft and tied to the frame through a load cell but may be mounted directly on the frame by means of a flexure strut arrangement with the load cell incorporated in the strut arrangement. These and other modifications are possible without involving any departure from the spirit and scope of our invention as set forth in the appended claims.

What is claimed is:

1. In a dynamometer having a minimum, maximum and trim rotational inertia for simulating the inertial and road load forces which a motor vehicle would experience during operation on a road bed, the combination comprising:
   a) a frame;
   b) at least one roll rotatably mounted on the frame for engaging a driven wheel of the vehicle;
   c) a power absorbing and inertia simulating unit comprising an electrically and magnetically conducting rotor wheel rotatably mounted on the frame and permanently coupled to the roll for rotation therewith and at least one stationary field coil positioned adjacent the rotor wheel for inducing eddy currents in the rotor wheel during rotation of the roll to apply a braking torque to the roll, the rotor wheel being in the form of a drum open at one end with a hollow braking section extending axially from the open end to a web section extending radially inwardly to a hub mounted on the shaft, the rotational inertia of the rotor wheel being equal to the trim inertia and within a range of 50% to 90% of the minimum inertia of the dynamometer;
   d) force sensing means coupled between the roll and the frame for providing a measure of the force applied to the vehicle wheel minus the force attributable to the dynamometer parasitic losses;
   e) speed sensing means for providing a measure of the roll speed; and
   f) control means responsive to the roll speed and the force applied to the vehicle wheel for controlling the current to the field coil to absorb power from the roll so that the force applied to the vehicle wheel is proportional to a force associated with a selected simulated inertia and road load for the vehicle.

2. The dynamometer of claim 1 wherein the rotational inertia of the rotor wheel is within the range of 70 to 90% of the minimum inertia of the dynamometer.

3. The dynamometer of claim 2 wherein the rotational inertia of the rotor wheel is about 85% of the minimum inertia of the dynamometer.

4. The dynamometer of claim 1 wherein said at least one stationary field coil comprises, a stator assembly including a plurality of individual pairs pole pieces circumferentially arranged around the shaft and positioned adjacent the braking section of the rotor, a field coil being wound on each core.

5. The dynamometer of claim 4 wherein the coupling between the roll and rotor wheel includes a shaft and wherein the stator assembly includes a hub rotatably mounted on the shaft, the force sensing means being connected between the stator assembly and the frame.

6. The dynamometer of claim 5 wherein the flywheel assembly comprises first, second and third flywheels with the flywheels constructed and arranged to simulate 500, 1000 and 2000 pounds, respectively.

7. In a chassis dynamometer having a base rotational inertia for simulating the inertial and road load forces which a motor vehicle would experience during operation on a road bed, the dynamometer including a frame, at least one roll rotatably mounted on the frame for engaging at least one driven wheel of the vehicle, power absorbing and inertial simulating means coupled to the roll for applying a braking force to the roll, a force transducer for providing a measure of the force applied to the vehicle wheel minus the force attributable to the dynamometer parasitic losses, means for providing a measure of the roll speed and control means responsive to the roll speed and the force applied to the vehicle wheel for controlling the power absorbing means, the improvement of the power absorbing and inertial simulating means comprising:
   a combined power absorbing and inertia simulating unit having a ferrous rotor wheel rotatably mounted on the frame for rotation with the roll and a stationary field coil arrangement positioned adjacent the rotor wheel for inducing eddy currents in the rotor wheel to apply said braking force to the wheel, the rotor wheel being in the form of a drum open at one end with a hollow braking section extending axially from the open end to a web section extending radially inwardly to a hub mounted on the shaft, the rotor wheel having a rotational inertia which is within the range of 50 to 90% of the base inertia of the dynamometer.

8. The dynamometer of claim 7 wherein the base rotational inertia is equal to the inertia of the roll plus a trim inertia and wherein the rotational inertia of the rotor wheel is equal to the trim inertia.

9. The dynamometer of claim 8 wherein the rotational inertia of the rotor wheel is within the range of about 70% to 90% of the base inertia of the dynamometer.

10. The dynamometer of claim 7 wherein the rotor wheel is connected to the roll by a shaft, wherein the stator assembly includes a hub rotatably mounted on the shaft and wherein the force sensing means is connected between the stator assembly and the frame.

11. The dynamometer of claim 10 wherein said at least one stationary field coil comprises, a stator assembly including a plurality of individual cores circumferentially arranged around the shaft and positioned adjacent the braking section of the rotor, a field coil being wound on each core.

12. In a dynamometer having a designed minimum and maximum rotational inertia for simulating the inertial and road load forces which a motor vehicle would experience during operation on a road bed, the combination comprising:
   a) a frame;
   b) at least two rolls rotatably mounted on the frame for engaging a driven wheel of the vehicle;
   c) a power absorbing and inertia simulating unit comprising an electrically and magnetically conducting rotor wheel rotatably mounted on the frame and permanently coupled to the roll for rotation therewith and a plurality of stationary field coils symmetrically positioned around the rotor axis and adjacent the wheel for inducing eddy currents in the wheel during rotation of the roll to apply a braking torque to the roll, the rotor wheel being in the form of a drum open at one end with a hollow braking section extending axially from the open end to a web section extending radially inwardly to a hub mounted on the shaft, the rotor wheel having a rotational inertia at least equal to 20% of the maximum designed inertia to be simulated by the dynamometer;

d) a plurality of flywheels mounted on the frame;

e) coupling means for selectively coupling each of the flywheels to the roll for rotation therewith;

f) force sensing means coupled between the roll and the frame for providing a measure of the force applied to the vehicle wheel minus the force attributable to the dynamometer parasitic losses;

g) speed sensing means for providing a measure of the roll speed; and h) control means responsive to the roll speed and the force applied to the vehicle wheel for controlling the current applied to the field coil to absorb power from the roll so that the force applied to the wheel is proportional to a force associated with a selected simulated inertia and road load for the vehicle.

13. The dynamometer of claim 12 wherein the rotational inertia of the rotor wheel is within the range of 70 to 90% of the minimum inertia of the dynamometer.

14. The dynamometer of claim 1 wherein the rotational inertia of the rotor wheel is at least about 25% of the maximum inertia to be simulated by the dynamometer.

15. The dynamometer of claim 14 wherein the rotational inertia of the rotor wheel is at least about 31% of the maximum inertia to be simulated by the dynamometer.

16. The dynamometer of claim 1 further including a plurality of flywheels mounted on the frame and coupling means for selectively coupling each of the flywheels to the roll for rotation therewith.

17. In a chassis dynamometer having a base rotational inertia for simulating the inertial and road load forces which a motor vehicle would experience during operation on a road bed, the dynamometer including a frame, at least one roll rotatably mounted on the frame for engaging at least one driven wheel of the vehicle, power absorbing and inertial simulating means coupled to the roll for applying a braking force to the roll, a force transducer for providing a measure of the force applied to the vehicle wheel minus the force attributable to the dynamometer parasitic losses, means for providing a measure of the roll speed and control means responsive to the roll speed and the force applied to the vehicle wheel for controlling the power absorbing means, the improvement of the power absorbing and inertial simulating means comprising:

a combined power absorbing and inertia simulating unit having a ferrous rotor wheel rotatably mounted on the frame for rotation with the roll and a stationary field coil arrangement positioned adjacent the rotor wheel for inducing eddy currents in the rotor wheel to apply said braking force to the wheel, the rotor wheel having a rotational inertia which is within the range of 70 to 90% of the designed minimum inertia and at least about 20% of the designed maximum inertia to be simulated by the dynamometer.

18. The chassis dynamometer of claim 17 wherein the rotor wheel has a rotational inertia of about 85% of a 2,000 pound base inertia.

* * * * *

UNITED STATES PATENT AND TRADEMARK OFFICE
CERTIFICATE OF CORRECTION

PATENT NO. : 6,247,357 B1
DATED : June 19, 2001
INVENTOR(S) : Clayton Jr. et al.

It is certified that error appears in the above-identified patent and that said Letters Patent is hereby corrected as shown below:

Column 4,
Line 21, after "shaft" insert -- 20 --.

Column 5,
Line 6, after "cores" delete -- 35 --.

Signed and Sealed this

Second Day of April, 2002

Attest:

JAMES E. ROGAN
*Attesting Officer*     *Director of the United States Patent and Trademark Office*